US011227306B2

(12) United States Patent
Haberman et al.

(10) Patent No.: US 11,227,306 B2
(45) Date of Patent: Jan. 18, 2022

(54) METHODS, SYSTEMS, AND COMPUTER-READABLE MEDIA FOR DYNAMIC CONTENT ALLOCATION

(71) Applicant: FreeWheel Media, Inc., Philadelphia, PA (US)

(72) Inventors: Seth Haberman, New York, NY (US); Robert Bress, New Providence, NJ (US); Claudio Marcus, Andover, NH (US); James Southern, New York, NY (US)

(73) Assignee: FreeWheel Media, Inc., Philadelphia, PA (US)

( * ) Notice: Subject to any disclaimer, the term of this patent is extended or adjusted under 35 U.S.C. 154(b) by 383 days.

(21) Appl. No.: 14/729,873

(22) Filed: Jun. 3, 2015

(65) Prior Publication Data
US 2015/0348091 A1 Dec. 3, 2015

Related U.S. Application Data

(60) Provisional application No. 62/007,061, filed on Jun. 3, 2014, provisional application No. 62/087,650, filed
(Continued)

(51) Int. Cl.
*G06Q 30/02* (2012.01)
(52) U.S. Cl.
CPC ..... *G06Q 30/0244* (2013.01); *G06Q 30/0247* (2013.01); *G06Q 30/0264* (2013.01); *G06Q 30/0269* (2013.01)
(58) Field of Classification Search
CPC . G06Q 30/0207–0277; G06Q 30/0244; G06Q 30/0247; G06Q 30/0264; G06Q 30/0269
(Continued)

(56) References Cited

U.S. PATENT DOCUMENTS 10,002,368 B1 * 6/2018 Els .................... G06Q 30/0249
10,460,357 B1 * 10/2019 Bevacqua .......... G06Q 30/0277
(Continued)

FOREIGN PATENT DOCUMENTS

WO 2008/124537 A1 10/2008

OTHER PUBLICATIONS

Marketing Spot Optimization, IP.com Prior Art Database Technical Disclosure, IPCOM000229301D, Electronic Publication Date: Jul. 19, 2013.*
(Continued)

*Primary Examiner* — David J Stoltenberg
(74) *Attorney, Agent, or Firm* — BakerHostetler

(57) ABSTRACT

Systems and methods for the optimized allocation of content on a content distribution system according to a content distribution plan are described. In some embodiments, a management system may be configured to generate an optimized schedule for content distribution, such as an advertising campaign. For a television distribution schedule, an impressions forecast may be generated based on the available inventory and historical audience measurement information, such as television ratings for a television advertising campaign. An optimized schedule may be generated based on the impressions forecast and content may be distributed according to the optimized schedule. Measurement information relating to the distribution according to the optimized schedule may be analyzed and used to generate a re-optimized schedule, for example, that may be used to schedule the advertising campaign on a subsequent day.

18 Claims, 6 Drawing Sheets

Related U.S. Application Data on Dec. 4, 2014, provisional application No. 62/089,557, filed on Dec. 9, 2014.

(58) Field of Classification Search
USPC .......................................................... 725/32
See application file for complete search history.

(56) References Cited

U.S. PATENT DOCUMENTS

| | | | |
|---|---|---|---|
| 2001/0020236 A1 | 9/2001 | Cannon | |
| 2003/0110171 A1* | 6/2003 | Ozer | G06Q 30/0272 |
| 2004/0103024 A1* | 5/2004 | Patel | G06Q 30/02 705/14.53 |
| 2005/0021403 A1* | 1/2005 | Ozer | G06Q 30/0241 705/14.52 |
| 2006/0287915 A1* | 12/2006 | Boulet | G06Q 30/02 705/14.61 |
| 2007/0073585 A1* | 3/2007 | Apple | G06Q 40/00 705/14.46 |
| 2007/0107027 A1* | 5/2007 | Carruthers | G06Q 30/0277 725/97 |
| 2008/0207182 A1* | 8/2008 | Maharajh | H04M 15/41 455/414.1 |
| 2008/0271070 A1* | 10/2008 | Kanojia | G06Q 30/0251 725/32 |
| 2008/0273591 A1* | 11/2008 | Brooks | H04N 21/4181 375/240.01 |
| 2009/0055256 A1* | 2/2009 | Donahue | G06Q 30/0273 705/14.69 |
| 2009/0094634 A1* | 4/2009 | Haberman | H04N 21/6405 725/32 |
| 2009/0094639 A1* | 4/2009 | Haberman | H04N 21/812 725/34 |
| 2009/0228361 A1* | 9/2009 | Wilson | G06Q 30/0256 705/14.42 |
| 2009/0302108 A1* | 12/2009 | Patrick | G06Q 30/02 235/385 |
| 2010/0100414 A1* | 4/2010 | Lin | G06Q 30/0244 705/14.43 |
| 2010/0146542 A1* | 6/2010 | Weihs | H04N 7/17318 725/34 |
| 2010/0262455 A1* | 10/2010 | Karlsson | G06Q 30/02 705/14.45 |
| 2010/0262497 A1* | 10/2010 | Karlsson | G06Q 30/02 705/14.71 |
| 2010/0262499 A1* | 10/2010 | Karlsson | G06Q 30/02 705/14.72 |
| 2011/0010239 A1* | 1/2011 | Vijay | G06Q 30/0243 705/14.42 |
| 2011/0029363 A1* | 2/2011 | Gillenson | G06Q 30/0216 705/14.15 |
| 2011/0161162 A1* | 6/2011 | Ketchum | G06Q 30/0241 705/14.43 |
| 2011/0231253 A1* | 9/2011 | Crawford | G06Q 30/02 705/14.49 |
| 2011/0246297 A1* | 10/2011 | Buchalter | G06Q 30/0241 705/14.53 |
| 2012/0023522 A1* | 1/2012 | Anderson | G06Q 30/02 725/35 |
| 2012/0041816 A1* | 2/2012 | Buchalter | G06Q 30/02 705/14.41 |
| 2012/0059696 A1* | 3/2012 | Theberge | H04N 21/6582 705/14.4 |
| 2012/0136728 A1* | 5/2012 | Hsiung | G06Q 30/0275 705/14.71 |
| 2012/0185899 A1* | 7/2012 | Riedl | H04N 21/23424 725/35 |
| 2012/0221071 A1* | 8/2012 | Karlsson | A61N 1/3627 607/18 |
| 2012/0253926 A1* | 10/2012 | Chen | G06Q 30/0241 705/14.49 |
| 2012/0272265 A1* | 10/2012 | Flatt | H04N 21/25841 725/34 |
| 2013/0166395 A1* | 6/2013 | Vassilvitskii | G06Q 30/0244 705/14.73 |
| 2013/0205339 A1* | 8/2013 | Haberman | H04N 21/812 725/35 |
| 2013/0219427 A1* | 8/2013 | Zundel | H04N 21/23424 725/32 |
| 2013/0246180 A1 | 9/2013 | Steelberg et al. | |
| 2013/0268347 A1* | 10/2013 | Bala | G06Q 30/0242 705/14.41 |
| 2014/0006141 A1* | 1/2014 | Vassilvitskii | G06Q 30/0241 705/14.45 |
| 2014/0040015 A1* | 2/2014 | Haley | G06Q 30/0242 705/14.45 |
| 2014/0046777 A1* | 2/2014 | Markey | G06Q 30/02 705/14.66 |
| 2014/0074591 A1* | 3/2014 | Allen | G06Q 30/0244 705/14.43 |
| 2014/0081742 A1* | 3/2014 | Katsur | G06Q 30/0244 705/14.46 |
| 2014/0082660 A1* | 3/2014 | Zhang | H04N 21/258 725/32 |
| 2014/0123173 A1* | 5/2014 | Mak | H04N 21/44016 725/32 |
| 2014/0222593 A1* | 8/2014 | Cosman | G06Q 30/0254 705/14.73 |
| 2014/0278981 A1* | 9/2014 | Mersov | G06Q 30/08 705/14.53 |
| 2014/0297400 A1* | 10/2014 | Sandholm | G06Q 30/0243 705/14.42 |
| 2015/0087224 A1* | 3/2015 | Maharajh | G06Q 30/0261 455/3.06 |
| 2015/0094968 A1* | 4/2015 | Jia | G06Q 40/04 702/60 |
| 2015/0121418 A1* | 4/2015 | Jain | H04N 21/812 725/32 |
| 2015/0142513 A1* | 5/2015 | Shnayder | G06Q 30/0206 705/7.31 |
| 2015/0235275 A1* | 8/2015 | Shah | G06Q 30/0269 705/14.66 |
| 2015/0339729 A1* | 11/2015 | Mahajan | G06Q 30/0244 705/14.71 |
| 2015/0348090 A1* | 12/2015 | Alsina | G06Q 30/0255 705/14.43 |
| 2015/0348091 A1* | 12/2015 | Haberman | G06Q 30/0244 705/14.43 |
| 2017/0195747 A1* | 7/2017 | Haberman | H04N 21/4532 |
| 2017/0249652 A1* | 8/2017 | Karlsson | G06Q 30/0251 |
| 2020/0344502 A1* | 10/2020 | Haberman | H04N 21/23424 |
| 2020/0404391 A1* | 12/2020 | Haberman | H04N 21/25883 |

OTHER PUBLICATIONS

Prediction and Optimal Scheduling of Advertisements in Linear Television; Panaggio et al., arXiv:1608.07305v1 [math.OC] Aug. 25, 2016.*

Open Network Quality of Service and Bandwidth Control: Use Cases, Technical Architecture, and Business Models; Brunetti et al., Bell Labs Technical Journal 16(2), 133-152 (2011) © 2011 Alcatel-Lucent. • DOI: 10.1002/bltj.20507.*

International Search Report and Written Opinion dated Sep. 3, 2015, from corresponding International Application No. PTC/US15/34055, International Filing Date Jun. 3, 2015.

* cited by examiner

| Problem | Desired Outcome | Optimization Outcome | Output |
|---|---|---|---|
| Under/Over Delivery 525a | Seller wants to avoid wasted opportunities from inconsistent campaign delivery | Campaign pacing to goal | Added or subtracted units from concurrent campaign schedules |
| Scheduling opportunity cost 525b | Seller receives other new that can optimally be fulfilled using some previously scheduled inventory | Portfolio of campaign goals and constraints | Moved schedule units to previously scheduled inventory to fulfill new campaigns |
| Changing viewing 525c | Seller wants to follow target audience as viewing changes | Frequently updated forecast target audience viewing data | Moved scheduled units to programming the target audience is now watching |
| Increasing reach or frequency 525d | Seller wants to find viewers that have not been or have low or high exposure to the campaign | Frequently updated forecast household reach and frequency data | Moves scheduled unites to placements that have higher/lower frequency and therefore improve overall reach or freq |
| Optimize inventory yield 525e | Seller wants to increase utilization of units that have a low monetization potential | Inventory pricing, either estimated or actual prices | Move scheduled units to placements that normally have a lower price |
| Cross-platform optimization 525f | Seller wants to use TV to deliver shortfalls on other more expensive platforms | Cross-platform campaign pacing to goal and frequently updated forecast audience viewing data | Move scheduled units to placements that have high frequency and therefore increase the overall target frequency |
| Performance feedback 525g | Seller wants to follow target audience as their definition and therefore viewing changes | Frequently updated target audience definition and viewing data | Move scheduled units to placements that normally have a lower revenue potential |

FIG. 5

METHODS, SYSTEMS, AND COMPUTER-READABLE MEDIA FOR DYNAMIC CONTENT ALLOCATION

CROSS-REFERENCE TO RELATED APPLICATIONS

This application claims the benefit of U.S. Provisional Application No. 62/007,061, filed on Jun. 3, 2014, No. 62/087,650, filed on Dec. 4, 2014, and No. 62/089,557, filed on Dec. 9, 2014, the contents of which are all incorporated by reference in their entireties as if fully set forth herein.

FIELD OF INVENTION

The present invention generally relates to the allocation of content to consumers, and, more specifically, to dynamically optimizing the scheduling of content transmission based on content provider objectives in view of content inventory, historical information, and/or content interaction forecasts.

BACKGROUND

Conventional media scheduling systems, such as broadcast television scheduling and/or traffic and billing systems, schedule advertisement content based on broad, static inventory units. Typically, such scheduling systems cannot modify active (or "in flight") advertisement campaigns to optimize the schedule of the individual campaign advertisements based on, for example, updated audience or inventory value information. Accordingly, inventory holders, such as national networks or cable and satellite providers, are not able to fully exploit revenue opportunities for their inventory, failing to capitalize on anywhere from 5-15% of potential revenue for an advertising campaign running on their systems.

At the conclusion of an advertising campaign, the inventory holder typically over- or under-delivers against the media goals of the advertiser, such as viewer impression based campaign goals. In the case of over-delivery, the inventory holder has essentially given away advertising inventory, while in the case of under-delivery, the inventory holder may be liable to allocate more media to the advertiser to make up the difference. Accordingly, inventory holder systems would benefit from systems and methods adapted to efficiently and effectively dynamically allocate inventory over the course of an advertising campaign to minimize the over- and under-delivery of campaign goals while optimizing inventory revenue opportunities.

SUMMARY

This disclosure is not limited to the particular systems, devices and methods described, as these may vary. The terminology used in the description is for the purpose of describing the particular versions or embodiments only, and is not intended to limit the scope.

In an embodiment, a system for optimizing content allocation may comprise a processor and a non-transitory, computer-readable storage medium in operable communication with the processor. The computer-readable storage medium may contain one or more programming instructions that, when executed, cause the processor to receive inventory information from at least one service provider computing device, receive historical target measurement information and content originator information associated with at least one content asset, generate at least one impression forecast based on the historical target measurement information and the inventory information, generate at least one optimized schedule based on the content originator information and the at least one impression forecast, transmit the at least one optimized schedule to at least one content trafficking computing device for presentation of the at least one content asset to a plurality of targets according to the at least one optimized schedule, receive target measurement information indicating interaction with the at least one content asset by the plurality of targets, and generate an updated at least one optimized schedule re-optimized based on the target measurement information.

In an embodiment, a computer-implemented method for optimizing content allocation may include, by a processor, receiving inventory information, receiving historical target measurement information and content originator information associated with at least one content asset, generating at least one impression forecast based on the historical target measurement information and the inventory information, generating at least one optimized schedule based on the content originator information and the at least one impression forecast, transmitting the at least one optimized schedule to at least one content trafficking computing device for presentation of the at least one content asset to a plurality of targets according to the at least one optimized schedule, receiving target measurement information indicating interaction with the at least one content asset by the plurality of targets, and generating an updated at least one optimized schedule re-optimized based on the target measurement information.

In an embodiment, a computer-readable storage medium may have computer-readable program code configured to optimize content allocation. The computer-readable program code may include computer-readable program code configured to receive inventory information from at least one service provider computing device, computer-readable program code configured to receive historical target measurement information and content originator information associated with at least one content asset, computer-readable program code configured to generate at least one impression forecast based on the historical target measurement information and the inventory information, computer-readable program code configured to generate at least one optimized schedule based on the content originator information and the at least one impression forecast, computer-readable program code configured to transmit the at least one optimized schedule to at least one content trafficking computing device for presentation of the at least one content asset to a plurality of targets according to the at least one optimized schedule, computer-readable program code configured to receive target measurement information indicating interaction with the at least one content asset by the plurality of targets, and computer-readable program code configured to generate an updated at least one optimized schedule re-optimized based on the target measurement information.

BRIEF DESCRIPTION OF THE FIGURES

FIG. 5 depicts illustrative problems solved using methods and systems configured according to some embodiments.

DETAILED DESCRIPTION

Figure 1:
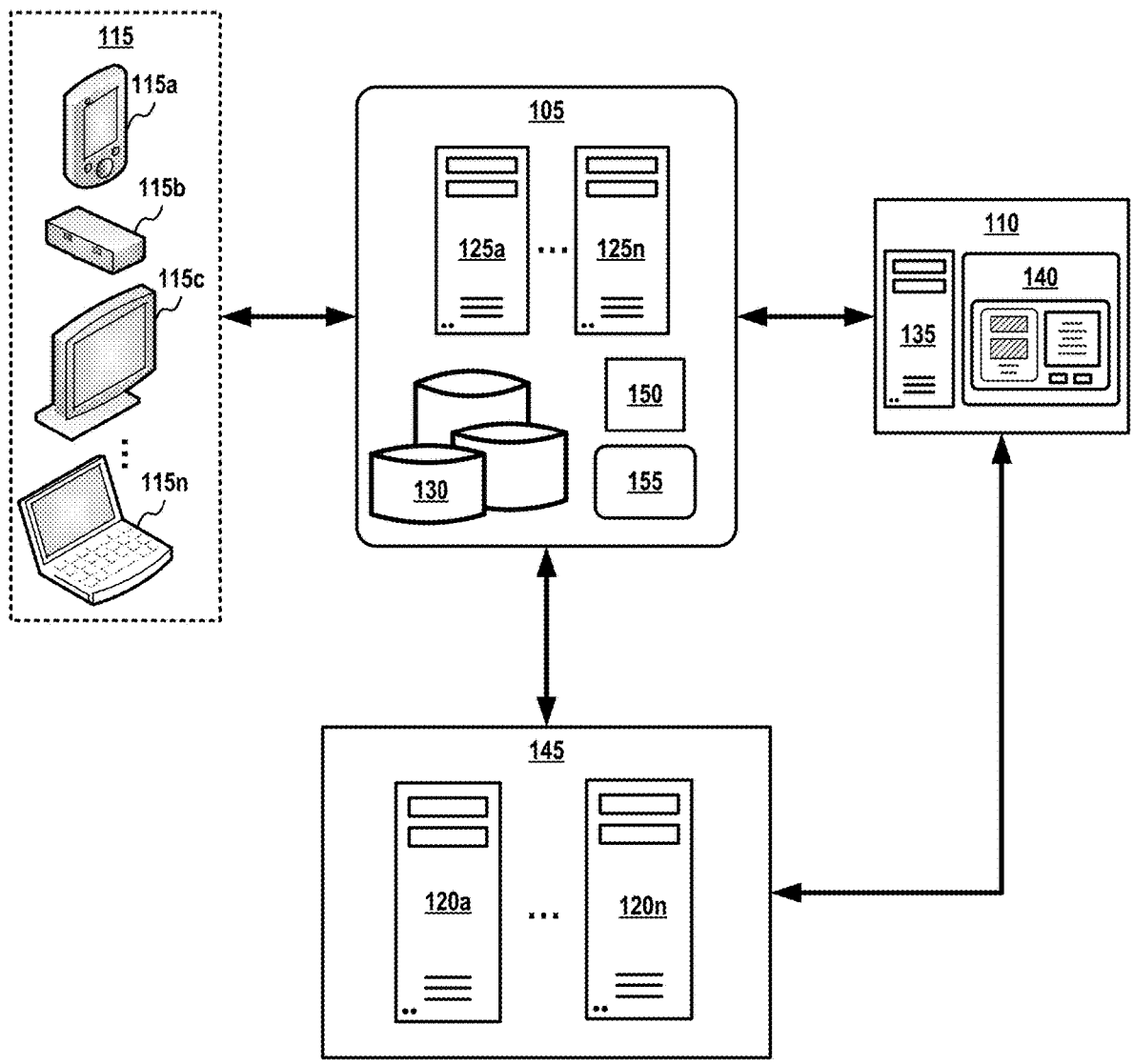
FIG. 1 depicts an illustrative management system according to some embodiments.

Throughout this disclosure, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In this disclosure, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, a system, and/or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise. As used in this document, the term "comprising" means "including, but not limited to."

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions may be conducted simultaneously.

The terminology used in the description is for the purpose of describing the particular versions or embodiments only, and is not intended to limit the scope.

The described technology generally relates to systems, methods, and computer readable media for optimizing content asset allocation (or a "schedule" or "distribution schedule") on a content distribution system according to a content distribution plan. A distribution plan may include any type of schedule and/or plan configured to specify the distribution of content, including, for instance, an advertising campaign for advertising content. In some embodiments, the content asset may include an advertisement and the content distribution plan may include an advertising campaign associated with advertiser goals, such as a budget, audience reach or impression goals, frequency of exposure goals, or the like. In some embodiments, content asset allocation may include a distribution or broadcast schedule for the content assets. In some embodiments, a content allocation management system (the "management system") may be configured to analyze, modify, optimize, or otherwise process a schedule based on current and/or historical information associated with, for example, the content assets, the content distribution system, the targeted audience, and/or the actual audience (for instance, "impressions"). The management system may generate an optimized schedule for presenting content assets and/or re-optimize a schedule based on audience interaction with the content assets distributed according to a schedule within available inventory (a "universe of inventory"). In some embodiments, the management system may be configured to optimally allocate and/or facilitate the optimal allocation of advertising content assets across a media schedule in order to maximize revenue opportunities for the owner of the advertising inventory while ensuring delivery against specific advertiser goals.

Although advertisers and advertising content may be used in examples in this disclosure, embodiments are not so limited, as any type and form of content capable of operating according to embodiments is contemplated herein. Non-limiting examples of content include messages, entertainment programming, and/or informational programming available over any type of applicable medium, including, but not limited to, television, radio, and electronic communication media (for example, Internet web sites, software applications, including mobile applications, "mobile apps" or "apps").

A campaign may generally refer to a series of content presentations (e.g., "creatives") generally related by a common idea or theme. An illustrative campaign may include an advertising campaign associated with various advertisements involving a common product or service. Advertisers may have several campaigns running simultaneously. Each campaign may be multiple weeks in length, during which advertisers' creatives, targeting, and daily budget may change. An advertiser content originator may purchase a large set of inventory (e.g., time slots on a television station, display elements, such as a banner advertisement, on a web page, etc.) and provide content originator information relating to mapping the campaign content assets onto the purchased inventory.

Inventory may generally include available recipients at one or more particular times. In some embodiments, inventory may comprise a plurality of inventory slots, with each slot including one or more targets at a particular time. For example, an inventory slot may comprise a set of set-top-boxes within a cable network during prime time viewing hours on a particular television channel. Each inventory slot may be associated with a value or price indicating the cost associated with placing content therein.

In some embodiments, the management system may be configured to optimize the placement of content within the universe of inventory. For example, a cable network user may have a particular set of goals that may be different or partially different than the goals of an advertiser user. The cable network user may have goals directed toward, among other things, maximizing advertising revenue from advertisers placing advertising content in available inventory slots as well as meeting their own internal advertising goals with the least valuable inventory, for instance, in order to preserve higher value inventory for generating revenue. The advertiser user may have goals directed toward reaching campaign goals, such as certain demographic targets, within a budget and within the time allotted for a particular advertising campaign.

In some embodiments, the management system may include processes such as the planning, buying, allocation of content inventory, and/or communicating with systems capable of performing such processes, including supporting and/or facilitating all or some of these processes. For instance, all or part of a distribution plan may be optimized automatically by the management system, with or without manual optimizations, and the optimization and/or distribution results (for example, impressions) displayed in a quantifiable manner using terms, numbers, and/or graphical representations. In some embodiments, the management system may be configured to provide for the planning, buying, scheduling, and/or allocation of content assets and/or inventory over multiple heterogeneous systems including a cable television network, a satellite television network, an Internet service provider network, a telecommunications network (for example, using mobile communication technologies such as third Generation (3G), fourth Generation (4G), long-term evolution (LTE), or the like), and any other type of system in existence now or in the future capable of providing content to content presentation devices.

A content asset (or "content") may generally include any type of data, information, media, or the like that may be expressed through a medium. Illustrative mediums may include audio and visual mediums such as television, radio, and broadcast, cable, satellite, and/or network (e.g., the Internet) forms thereof. Examples of content may include, but are not limited to, video, audio, movies, video games, television and radio programs, commercials, websites, images, photographs, text, electronic or digital documents, information feeds, streaming media, social media, social networks, and/or combinations thereof. In some embodiments, content may include an advertisement, such as a television advertisement or an online advertisement including, without limitation, website advertisements, Internet advertisements, search engine marketing (SEM), social media marketing, and mobile device advertising.

The content assets may be distributed or broadcast by a service provider to various content presentation devices. A service provider may generally include any type of entity or structure capable of providing content assets to a content presentation device. For instance, the service provider may include a television broadcast network, a cable television network, a satellite television network, an internet service provider (ISP), a computing device advertising network, a media distribution network, a cloud computing network, a local area network (LAN), a wide area network (WAN), a terrestrial network, a mobile network, and/or any combination thereof. Television networks may include standard definition (SD) and high definition (HD) networks.

In some embodiments, the management system may be configured to operate across physical device platforms, networks, and/or service providers simultaneously. For example, content assets and/or a distribution schedule thereof, such as an advertising campaign, may be managed by the management system in association with set-top-boxes over a cable television system, mobile computing devices using standard network communication protocols (for instance, Ethernet or Wi-Fi) over an Internet service provider network, and/or to smart phone devices over standard telecommunication protocols (for instance, 3G, 4G, LTE, or the like).

A content presentation device may generally include any device now known to those having ordinary skill in the art or developed in the future that is capable of presenting content assets to a viewer or other type of content consumer. Non-limiting examples of content presentation devices include televisions, smart televisions, laptops, personal digital assistants (PDAs), tablet computing devices, smartphones, personal computers (PCs), display monitors or terminals, radios, audio devices, speakers, headphones, haptic devices, electronic reading devices ("e-readers"), light emitting diode (LED) devices, organic LED (OLED) devices, wearable screens, set-top-boxes, satellite receivers, video-on-demand (VOD) receivers, content receivers (e.g., Apple TV® manufactured by Apple Inc. of Cupertino, Calif., United States; Roku® manufactured by Roku, Inc. of Saratoga, Calif., United States), digital video recorders (DVRs), personal video recorders (PVRs), hard drives, flash drives, storage servers, digital video disc (DVD) devices, Blu-Ray™ devices, or the like. A recipient, viewer, audience member, or the like may generally include an individual viewing, consuming, recording, streaming, or otherwise interacting with a content asset using a content presentation device.

A content originator may include any entity capable of providing content assets for distribution by a service provider. A content originator may include any type of content developer known to those having ordinary skill in the art, such as an advertiser, an advertising agency, a television studio or broadcast network, a radio channel, a website provider, a VOD service, a content storage and delivery service, or the like. An advertiser content originator may have advertisement content assets associated with one or more products or brands that they seek to have distributed by a service provider according to content originator information, which may include, without limitation advertising campaign information, campaign goals and/or constraints, campaign target information, or the like. Goals are typically expressed as a combination of budget and reach and frequency of exposure targets. Typically, the content originator (or "buyer") may attempt to meet, or get as close as possible to, the campaign goals while staying within budget. The content originator and/or service provider may look at various information, such as ratings data, inventory pricing, and commercial or TV spot rotations, to derive an optimal allocation of inventory against the goals. This process may be performed for a single product with a single advertisement, or for a single product with multiple advertisement (for example, with different target demographic audiences), for multiple products (for example, with each product being associated with one or more advertisements), for multiple advertisers (for example, with one or more advertisements each), or various combinations thereof.

In some embodiments, the management system may receive a first schedule (for example, a first or initial distribution) for distributing content assets. In some embodiments, the management system may generate the first schedule. In some embodiments, the management system may receive optimization information that may be used to generate an optimized schedule. The optimization information may include, but is not limited to, information associated with target recipients, historical measurement information (for instance, "ratings"), content originator goals and/or constraints, inventory information, or the like. In some embodiments, the inventory information may include inventory availability information. In some embodiments, the inventory information may be accessed via a schedule pre-log file, which may include a file generated and made available at a certain interval (for instance, daily, hourly, or the like) from an inventory holder detailing the expected network and time play out of available advertising units. In some embodiments, the historical measurement information may include ratings information (i.e., Nielsen® ratings), including measurement information segmented according to target demographics ("historical target measurement information"). In some embodiments, the historical measurement information may include or may be used to correlate projected ratings for a current content asset based on the previous distribution of the same or similar content assets.

For example, historical target measurement information may be obtained to forecast or predict the ratings for a content asset for a particular product to be distributed to a particular target audience based on previous ratings for similar content assets for similar target audiences (for instance, 18-49 year old males during prime time hours).

In some embodiments, the content originator information may include information relating to an advertising schedule or campaign, campaign goals, and/or campaign restraints. For instance, each advertiser may define a target audience along with a target level of viewership over a specified period of time. In addition, each advertiser may set constraints against where or when their advertisement content assets may be distributed (or "play out"). For example, an advertiser may not want an advertisement to play out on children's' networks, overnight, or in a specific market or zone. An advertiser may be an external advertiser sold to by the inventory holder or the advertiser may be the inventory holder who may be promoting programming or other products. Goals may be defined using various types of goals known in the art, such as a target number of impressions against a specific audience (for example, 1,000,000 impressions from adults age 18-49) for a specific time period (for example, a campaign set to run over a two-week period). Goals may be stated in terms of measurable viewership metrics that can be used as collected to adjust goals over the course of the campaign. In an example having a 1,000,000 impressions goal over a two-week campaign, if after the first week, 200,000 impressions had been delivered, the goal for the second week would be 800,000 impressions.

In some embodiments, the management system may generate an impression forecast based on the optimization information. For instance, the management system may generate an impression forecast based on historical target measurement information and the inventory information. In some embodiments, the impression forecast may include expected viewership ratings and impressions for the advertiser target audience across the inventory and/or full potential schedule. In some embodiments, the impression forecast may be calculated based on the viewership footprint that could potentially see the advertisements.

In some embodiments, the management system may generate an optimized schedule based on the impression forecast and the content originator information. In some embodiments, the optimized schedule may include optimizing (or re-optimizing) an existing schedule. In some embodiments, the management system may implement the optimized schedule for distributing the content assets. In some embodiments, the management system may transmit the optimized schedule to a service provider and/or a component of a service provider, such as a content trafficking or scheduling component to implement the optimized schedule.

In some embodiments, the management system may receive target measurement information associated with recipient interaction with the content assets distributed according to a schedule, such as the optimized schedule. The target measurement information may include viewership ratings for the target audience. In some embodiments, the management system may re-optimize the optimized schedule based on the target measurement information in combination with other optimization information.

In general, the management system and methods used thereby, may operate to maximize total sales revenue of inventory by efficiently placing advertisers against their target audiences. The management system may use an analytic heuristic that places media according to how units of inventory rate against an advertiser's target audience. In addition, advertiser spots may be given priority based on how far they are away from their target goal. In some embodiments, advertisers that are underperforming may be given higher priority in where they are allocated in order to ensure the underperforming advertiser, as well as the other advertisers, meet their goals. Inventory owners can set priorities to advertisers as needed based on pricing, historic relationships, or various other factors described herein. By efficiently placing media against target audiences, more units may be available for sale to other advertisers, thereby maximizing the amount of revenue that can be generated on a per unit basis.

In some embodiments, the analytic heuristic used by the management system may attempt to schedule content assets based on various conditions including, without limitation, how highly units of inventory rate against the content originator's forecast target audience, how far the advertiser units are away from their target goal, whether content originators are under-pacing or not to give higher priority to content assets that need it to reach their campaign or other distribution goals, special content originator relationships or pricing, and/or content originator specified constraints against networks, day, time, programming, geography, or the like.

In some embodiments, the management system may place each advertiser spot while maintaining specified constraints against networks, time, programming, geography, budget, or the like. In some embodiments, the management system may output an optimized schedule similar to a schedule pre-log where all advertiser spots are placed optimally. In some embodiments, the optimized schedule may serve as the instructions to a gateway, submitted to the inventory holder for entry into their traffic and billing system, or the like. In some embodiments, the gateway is a server computing device installed within the inventory holder's insertion path which can be used to automatically traffic the optimized schedule instructions. The advertisements may then play out according to the optimized schedule. Once measurement information, such as viewership data (e.g., through Nielsen® data, set-top box data, or other sources), is made available, that information may be used to update advertiser campaign progress against the content originator information, such as advertiser goals. Based on whether each advertiser has under- or over-delivered against their goals, the pacing against the next-day's schedule can be adjusted appropriately through a re-optimized schedule.

FIG. 1 depicts an illustrative management system according to some embodiments. As shown in FIG. 1, a service provider 105 may be configured to distribute content to various content presentation devices 115a-n. For example, the service provider 105 may be a cable television provider configured to distribute television programs and advertisements to subscriber set-top boxes 115b and/or televisions 115c. The service provider 105 may include service provider computing devices 125a-n and may be in communication with service provider databases 130, which may include historical measurement information, inventory information, and/or other information associated with the service provider and/or the distribution of content assets. In some embodiments, the service provider databases 130 may include third-party databases, such as the Nielsen® ratings database. The service provider 105 may be in communication with and/or include a traffic and billing system 150 configured to reserve inventory, determine advertising rates, configure future campaigns, and the like. In some embodiments, the traffic and billing system 150 may generally create and/or manage schedule logs that schedule the content originator's 110 advertising campaigns according to their contracts with the service provider 105. The schedule logs may include future logs, pre-logs, or any other type of schedule log for scheduling the content originator's 110 content assets.

The service provider 105 may be associated with inventory that may be made available (or "sold") to a content originator 110, such as an advertiser. The content originator 110 may include and/or have access to content originator computing devices 135, such as a server computing device, and content assets 140. A management system 145 may be in communication with the content provider 105 and may include management system computing devices 145, such as server computing devices configured to store information and/or perform functions described according to some embodiments herein. Although the management system 145 is depicted as a separate component from the service provider 105 in FIG. 1, embodiments are not so limited, as the management system may be a component of the service provider.

Figure 2:
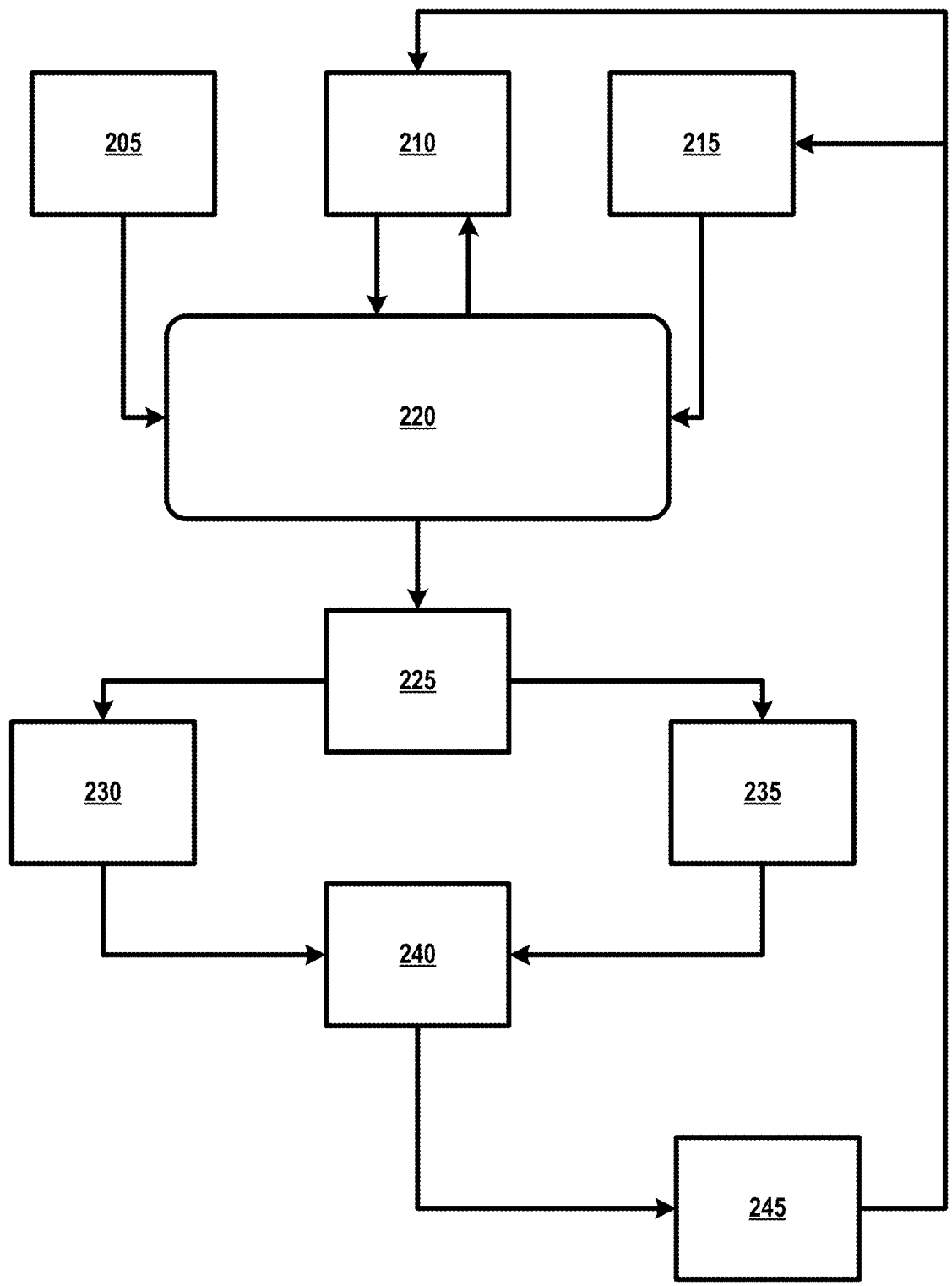
FIG. 2 depicts an illustrative flow diagram for a method of optimizing content allocation according to some embodiments.

FIG. 2 depicts an illustrative flow diagram for a method of optimizing content allocation according to some embodiments, for example, using the management system depicted in FIG. 1. As shown in FIG. 2, the management system 145 may receive information from the service provider 105, such as inventory availability made available through a schedule pre-log 205 generated by the traffic and billing system 150 and/or historical target measurement information 210, for example, from the service provider databases 130. In some embodiments, the historical target measurement information 210 may include forecasted ratings and/or impressions across a distribution schedule.

The management system 145 may receive advertiser campaign goals 215 from the service provider 105 and/or the content originator 110 via the computing devices 125*a-n*, 135 thereof. The management system 145 may use a schedule optimization process 220 to generate one or more impression forecasts 210 based on the historical target measurement information and the inventory information. The content originator 110 allocation for the content assets 140 may be optimized across a distribution schedule. In some embodiments, the management system 145 may generate an optimized schedule 225 for the distribution of the content assets 140 (for instance, an optimized advertising campaign schedule). The optimized schedule 225 may be transmitted for play out 240 via a content trafficking system 235 and/or a gateway 230 computing device. The content assets 140 (for example, advertisements) are distributed to (or played out on) the content presentation devices 115*a-n* via the service provider's 105 distribution network. Measurement information 245 relating to recipient interaction with the distributed content assets 140, such as viewership results, are obtained by the service provider 105 and accessed by the management system 145. The optimized schedule may be adjusted for the next distribution cycle (for instance, a "broadcast day" or "broadcast day-part") based on the measurement information to optimize the distribution schedule. In some embodiments, the measurement information may be stored as historical measurement information, for instance, in the service provider databases 130. In some embodiments, the advertiser campaign goals 215 may also be adjusted based on the measurement information 245.

Figure 3:
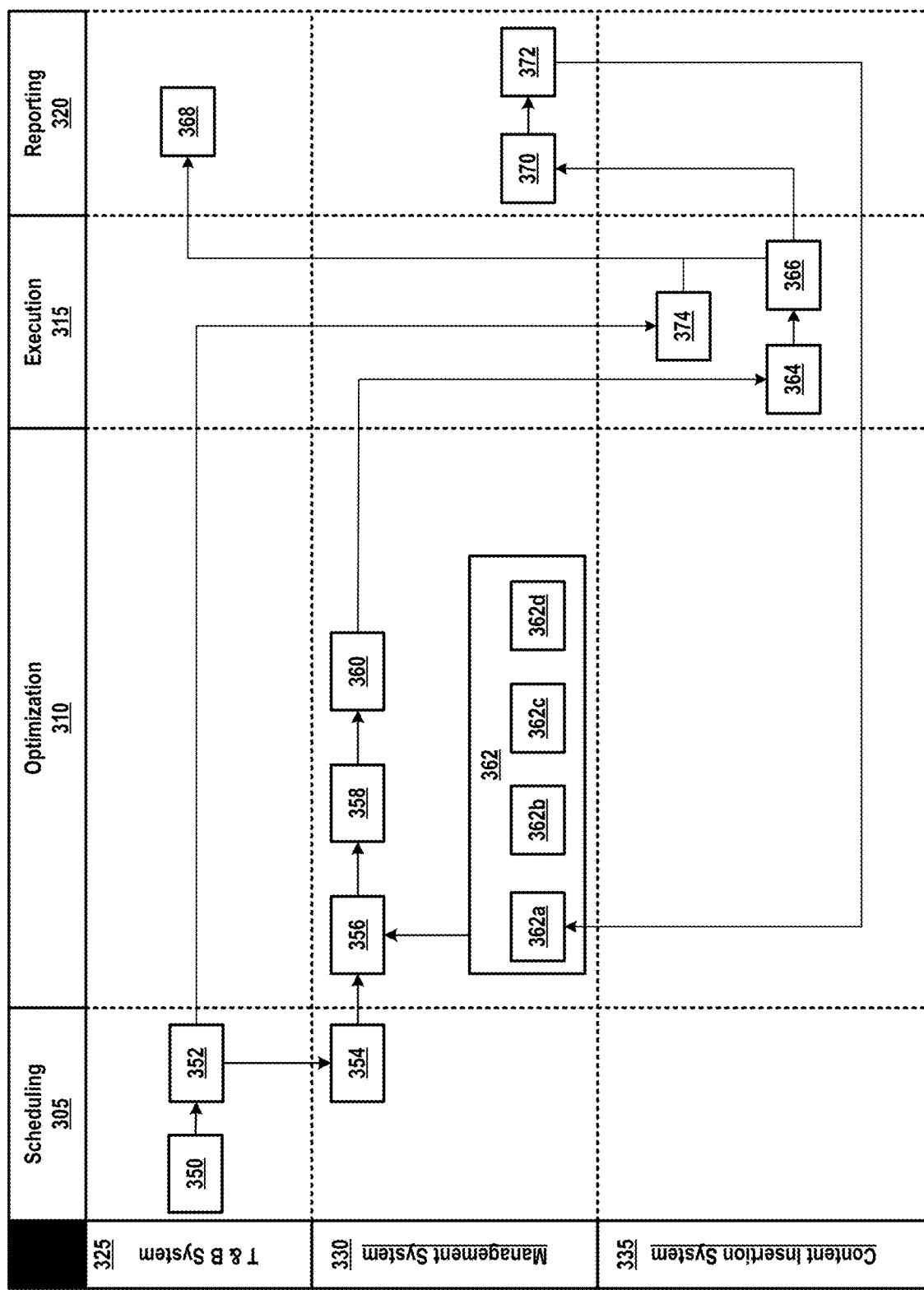
FIG. 3 depicts an illustrative flow diagram for a method of optimizing content allocation according to some embodiments.

FIG. 3 depicts an illustrative flow diagram for a method of optimizing content allocation according to some embodiments. As shown in FIG. 3, a future schedule 350 may be generated by the traffic and billing ("T & B") system 325 during a scheduling phase 305. The future schedule 350 may include a file delivered from an inventory owner to the management system 330 detailing the expected network and time play-out of each available advertising units A pool of advertising 352 that may be optimized may be identified, for example, by assigning the advertising units to a special advertising identification number used to designate all advertising that may be optimized.

The management system 330 may access the future schedule log 350 and, during an optimization phase 310, may obtain the optimization information (or "optimization inputs") 356, such as various optimization information sources including, without limitation, campaign pacing or performance information 362*a*, audience information 362*b*, campaign goals and constraints 362*c*, and/or inventory pricing information 362*d*. Pacing information for concurrent campaigns may be used to prioritize the allocation of inventory to those most in need based on goal delivery. Campaign schedules may be optimized in the context of competing campaigns and priorities according to some embodiments described herein. Additional non-limiting examples of optimization information sources 362 may include continuously updated forecast household reach and/or frequency data, predicted or assigned inventory pricing and/or clearance data, updated forecast viewing data of a particular audience segment, campaign pacing and progress information for one or more campaigns, placement rules and preferences defined by the service provide and/or content originator, reach information, frequency information, media performance measurements, delivery feedback (including cross-platform feedback and concurrent delivery channels). Audience information may include expected viewership ratings and impressions for the advertiser target audience across the full potential schedule. Impressions may be calculated based on the viewership footprint that could potentially see the advertisements. Inventory pricing information may include the anticipated revenue the inventory holder (or "seller") has achieved based on historical information including the network and time, historical revenue information of a vertical or advertiser and any additional discount or mark-up applied by the seller. A particular pricing level may include the likelihood of clearance, the probability the ad actually runs at that price level The management system 330 may generate an optimization schedule 358. In some embodiments, the management system 330 may overwrite any future schedules 330 with the optimization schedule 358. The management system 330, during an execution phase 315, may transmit the optimization schedule optimized for the inventory pool 364 to a content insertion system 335, for example, via a local automation server. The advertisements are inserted (or played out) 366 according to the optimized schedule as the optimized schedule is read by the content insertion system 335. In some embodiments, the T & B system 325 may generate a non-optimized schedule for advertisements that may not be optimized. In some embodiments, the non-optimized advertisements 374 may also be inserted by the insertion system 335 and the measurement information reported to an all advertisement insertion report 368. The non-optimized advertisements may be pulled from the T & B system 335 of the inventory owner. The non-optimized schedule may include information relating to the expected advertiser creative, network and time play-out of each available advertising unit in the future.

The management system 370 may generate an advertisement insertion report 370 and/or calculate the goal pacing for optimized campaigns in an optimized advertising pool pacing report 372, for example, based on measurement information. The reports 368, 370, 372 and any other or any other forms of measurement information may be reported to the T & B system 325. The campaign schedule and/or pricing may be adjusted and/or optimized based on the measurement information.

Figure 4:
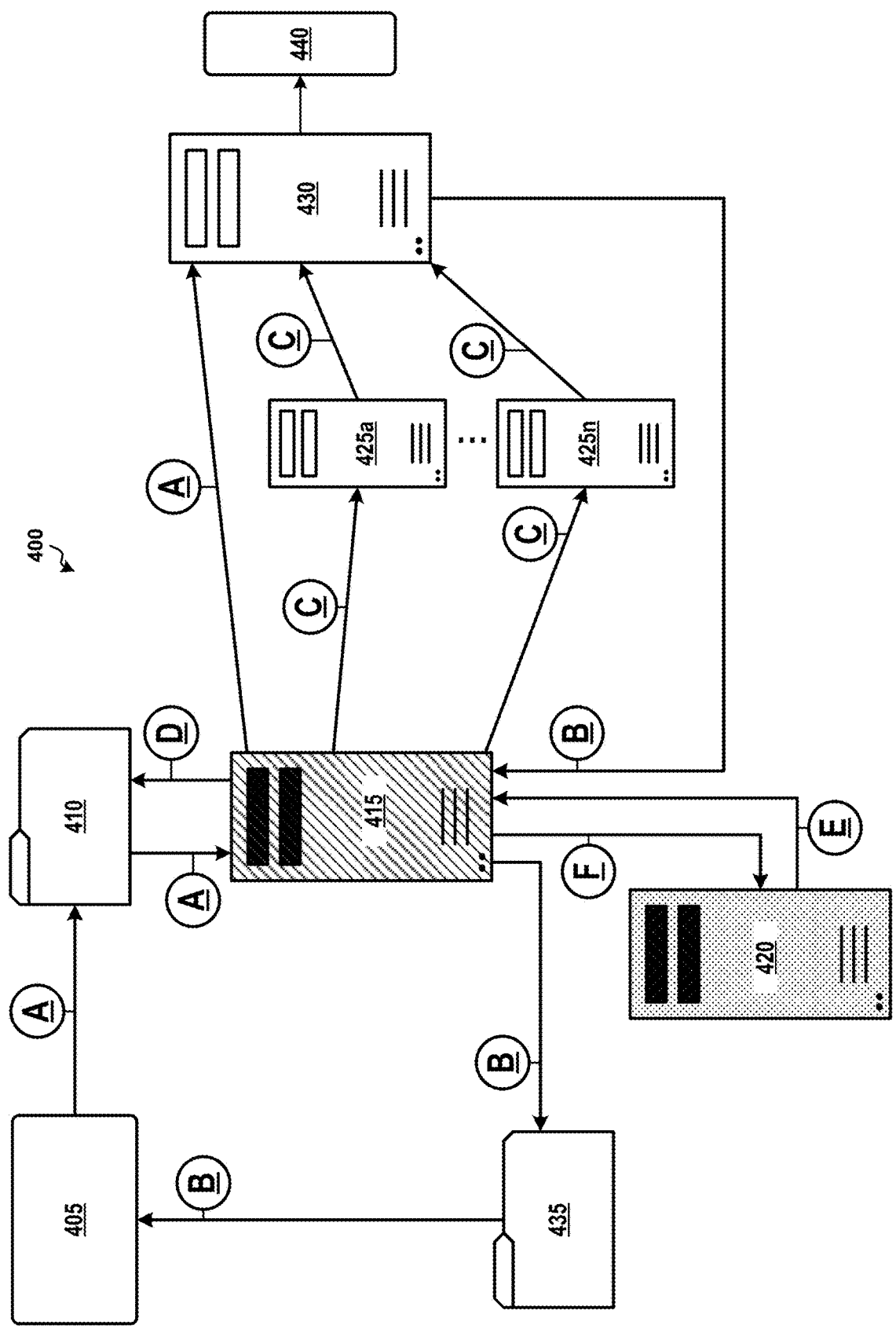
FIG. 4 depicts an illustrative optimized content presentation system according to some embodiments.

FIG. 4 depicts an illustrative optimized content presentation system according to some embodiments. As shown in FIG. 4, an optimized content distribution system 400 may include a traffic and billing system 405 that may be configured to transmit scheduling messages A, including schedule files 410. A local automation server 415 may be configured to receive schedule messages A and to monitor the schedule files 410. The optimized content distribution system 400 may include verification files 435 for insertions, for example, that may be used to calculate the estimated impressions achieved. The various components of the optimized content distribution system 400 may be configured to transmit and/or receive verification messages B relating to the distribution of content assets via the optimized content distribution system.

The local automation server 415 may be configured to transmit targeted play-out data F to an optimization system 420, for example, via a secure network connection. The optimization system 420 may be configured to transmit content asset and targeting information E to the local automation server 415. One or more media storage devices 425a-n may be configured to store various forms of media content, such as media storage devices for standard definition (SD) television content and media storage devices for high definition (HD) television content. The one or more media storage devices 425a-n may be configured to receive content from the local automation server 415 via content distribution transmissions or streams C. The one or more media storage devices 425a-n may transmit content assets to distribution equipment (for example, VICs, inserters, or the like) which may play out the content assets to various content presentation devices 440 through various channels, such as a television channel, an Internet channel, a mobile communications channel, or the like.

In some embodiments, the local automation server 415 may be configured as a specialized, proprietary server installed within an inventory owner's or other service provider insertion path. For example, a local automation server 415 may be used in systems using many edge insertion points that each require local schedule processing and/or that experience poor connectivity with the optimization system 420, such as local cable operators and local broadcast station groups that may have many potential insertion points.

The local automation server 415 may be configured to automatically execute optimized schedule instructions and traffic the creative units. In this manner, the advertising units may be played out according to the optimized schedule. The local automation server 415 may produce a verification file 435 of insertions and may send the verification file to the optimization system 420. The local automation server 415 may be configured to sleep and/or to wake up after a defined time and restart and/or repeat the processes and functions described according to some embodiments herein. The local automation server 415 may operate autonomously at the edge of a distribution system and to execute the last set of instructions it received if connectivity is lost.

Once viewership data is made available to the optimization system 420, for example, from sources such as Nielsen® rating data, set-top box, or the like, the viewership data may be matched up to the verification file 435 of insertions to calculate the estimated impressions achieved. The impression data may be used to update advertiser progress against goals. Based on whether each advertiser has under or over delivered against their goals, new instructions can be send to the local automation server 415 to increase or decrease impression delivery in the next time period.

In some embodiments, the local automation server 415 may monitor (via D, for example) single or multiple input paths for new schedule files 410. Once schedule files 410 are placed into the input path, the local automation server 415 may scan for any default inventory identifiers contained in its database. The default inventory identifiers may be replaced with an optimized inventory identifier and schedules may be passed to the output path. The optimization system 420 may send content in the appropriate formats, such as video formats (for example SD, 720p, 1080p and 4k) to the local automation server 415 to be loaded into a video library system stored, for example, on one or more media storage devices 425a-n. These files can be loaded to a single or multiple locations in various forms known in the art, including a .mpg file, .dvl file, or both, or the like. The insertion equipment 430 may read the optimized schedule file 410 and may insert the correct optimized advertisement from the video library into the applicable TV, internet, mobile or other media stream to a content presentation device 440.

For verification processing, the local automation server 415 may scan all verification files 435 for the optimized inventory identifier and substitute the default inventory identifiers before they are sent back to the traffic and billing system 405. In this manner, all verification files 435 sent back to the traffic and billing system 405 may match schedules that were originally sent out. Optimized inventory play-outs may be recorded in the local automation server 415 database and synchronized and/or backed up to the optimization system 420 at periodic intervals. The local automation server 415 may wake up after a defined time period and repeats the processes and functions described according to some embodiments.

In some embodiments wherein insertions are executed centrally or in a few hub locations, and connectivity is reliable, the local automation server 415 may not be required. In such embodiments, the functions in the local automation server 415 may be virtualized in software within the optimization system 420. The optimization system 420 may interface directly with the local insertion or central automation and systems, and feed optimized schedules and media to those systems. Such a centralized model may be used for each national broadcaster, cable network, or other service providers that assemble the programming and advertising in a single broadcast center location, and may also be used with high-reliability local insertion systems.

In some embodiments, the methods and systems described according to some embodiments for optimized television impression execution may be configured to be applicable to all programming types, including television programming, and access technology that are subject to a process of scheduling and insertion of advertising into live and time-shifted television content. For example, national broadcast television operates nationally, such as across the whole United States. Linear national television advertising is scheduled before play-out and inserted at the right time into the national broadcast stream. In this case, a local automation server 415 may send instructions to the automation systems in a broadcast center to control the insertion of optimized advertising.

National cable network television typically operates regionally or nationally, such as across the whole United States, although some networks may only have partial coverage. Linear national television advertising is scheduled before play-out and inserted at the right time into the national broadcast stream. In this case, a local automation server 415 may send instructions to the automation systems in the broadcast center to control the insertion of optimized advertising into the national linear feed Syndicated television includes programming that has been sold on to another distribution channel, typically national broadcasters or cable networks. Linear national television advertising is scheduled before play-out and inserted at the right time into the national broadcast stream, for example, according to the embodiment depicted in FIG. 3.

Local broadcast station television operates in one or more local designated market areas (DMA). Linear local television advertising is scheduled before play-out and inserted at the right time into the local broadcast stream. In this case, the local automation server 415 may send instructions to the automation systems in the broadcast center to control the insertion of optimized advertising into the local linear feed, for example, according to the embodiment depicted in FIG. 3.

Multichannel video programming distributors (MVPDs) such as a cable, satellite, or telecommunication ("telcos") distributors operate nationally and in local markets across the US and distribute content created by national and local programmers to paying subscribers. Satellite operators schedule national television advertising by before distribution. Advertising is inserted into the national feeds that vary by time zone and are broadcast nationally. In this case, the local automation server 415 may send instructions to the insertion systems in the national advertising infrastructure to control the insertion of optimized advertising into the national linear feed, for example, according to the embodiment depicted in FIG. 3.

Cable and telco operators schedule local community television advertising or an aggregation thereof before distribution. Advertising is inserted at the right time into the local broadcast stream at the community level. In this case, the local automation server 415 may send instructions to the insertion systems in the local advertising infrastructure to control the insertion of optimized advertising into the local linear feed, for example, according to the embodiment depicted in FIG. 3.

MVPDs may operate household addressable advertising systems that allow advertising to be served at the household or device level. Linear household addressable television advertising is scheduled before play-out and delivered at the right time to the relevant household. In this case, the local automation server 415 may send instructions to the insertion systems in the set-top box and addressable advertising infrastructure to control the delivery of optimized advertising, for example, according to the embodiment depicted in FIG. 3.

Device and Internet Television content that is made available by the MVPDs, Online Video Distributer, and/or other service providers may be distributed directly to the viewer over the Internet. Scheduled advertising can be inserted into live and time-shifted content by systems such as VOD systems, DVRs/PVRs, TV Everywhere streaming, and over the top television content delivery solutions. In this case, the local automation server 415 may send instructions to the insertion systems in the content delivery network at the edge play-out point to control the insertion of optimized advertising into the live or time-shifted, for example, according to the embodiment depicted in FIG. 3.

The methods and systems described according to some embodiments for optimized television impression execution may be independent of, and applicable to, all television access systems known in the art and developed in the future. For example, advertising optimized according to some embodiments may be inserted into a television content stream and a television household or business may access the programming and advertising content regardless of how access method for the television signal, including, without limitation over the air access through antennas, direct broadcast satellite, cable television, telco television, broadband television, mobile television (for instance MDTV), or the like.

The methods and system described according to some embodiments may be used to solve many business problems with impression-based campaigns that are experienced by inventory holders and advertisers. For example, the methods and system described according to some embodiments can optimize the impression-based execution if provided with the relevant data and updated processes.

Each of these problems is data-intensive and requires the application of complex processes involving the transmission of content assets to solve and so can only reasonably be solved by computer. The primary business problem involves the gathering of millions of campaign goals, constraints and current and forecasted data points, from which the system must calculate the best viable solution across thousands of advertising placements and billions of schedule combinations without error. A system must be able to feed the compiled result into the execution systems within a limited time window that may be near-real-time.

Managing campaign under and over delivery is a common problem for service providers, inventory holders, or the like (or "media sellers" or "sellers"). At the conclusion of a campaign the inventory owner may over or under deliver the contracted audience to the advertiser. In the case of over-delivery, the inventory owner has consumed advertising inventory but will not receive payment from the advertiser, and in the case of under-delivery, the inventory owner may be liable to allocate more media to the advertiser to make up a shortfall. Embodiments described herein address this problem by continually making adjustments to the schedule to meet all concurrent campaign goals and execute. Application of the embodiments described herein applies equally to the inventory owners' own promotional marketing efforts where continuous schedule adjustments can improve delivery.

Extending campaign reach is a need of advertisers who try to reach the maximum consumers with a campaign and a problem for media sellers. Current technology does not provide a method within a fixed schedule to adjust placement to reach viewers that have only seen an advertisement a few times or not at all. Applied to the use of cross-platform media, as well where campaign reach can be extended to audiences who to not watch much TV but consume video on demand and Internet video on devices such as Smart TVs, computers, tablets and mobile devices. The optimization methods and systems according to some embodiments solves this problem by continually making adjustments to the schedule to find video programming where reach is low, and execute on it according to some embodiments. Such an application of the described embodiments may apply equally to the inventory owners' own promotional marketing efforts where continuous schedule adjustments can improve reach.

Exploiting last-minute premium revenue opportunities is a problem for sellers that have already committed premium units to an advertiser. Another advertiser may offer higher prices for the same audience or inventory, but the inventory owner is unable to re-allocate the inventory to secure the premium pricing opportunity. Embodiments described herein may solve this problem by continually making adjustments to the schedule to find the highest revenue opportunity for the seller across all competing campaigns and to implement the schedule according to some embodiments.

Reacting to changing audience viewing patterns is a problem for sellers, and a seller may not be able to deliver the contracted audience because of a fixed schedule. The methods and system described according to some embodiments may solve this problem by continually making adjustments to the schedule to find the target audience despite changes in viewing patterns and execute on it as described according to some embodiments. Such an application may apply equally to the inventory owners' own promotional marketing efforts where continuous schedule adjustments can follow the target audience.

Optimizing impression-based inventory revenue yield is a problem for sellers. Frequently an inventory owner is unable to sell impression-based inventory at the asking price and because of the temporal nature of TV must deeply discount it to receive some revenue. The inventory retains its highly valuable audience but it just couldn't be sold in time. The methods and system described according to some embodiments may solve this problem by continually making adjustments to the schedule to find under-monetized inventory and impressions, and executes it as part of premium priced campaigns according to some embodiments. Such application applies equally to the inventory owners' own promotional marketing efforts where continuous schedule adjustments can improve marketing impression yield.

Cross-platform contracted audience delivery is a problem for sellers. Increasingly an inventory owner is selling a variety of media types including television, time-shifted content, Video on Demand and Digital Video in the same inventory package to an advertiser. If one of these media types is under or over delivering they cannot easily compensate by modifying the TV schedule. The methods and system described according to some embodiments may solve this problem by continually making adjustments to the schedule to compensate for under/over delivery on the other media and execute on it according to some embodiments. Such application applies equally to the inventory owners' own promotional marketing efforts where continuous schedule adjustments can improve cross-platform delivery.

Reacting to media performance measurement feedback to support those sophisticated advertisers want the inventory owner to adjust the TV schedule based on performance feedback whether it is from sales, supply-chain or inventory triggers, web page visits or customer contacts. If this information is available, the inventory owner cannot easily change to schedule to increase the effectiveness for the advertiser. The methods and system described according to some embodiments may solve this problem by continually making adjustments to the schedule to find programming and audiences that are likely to drive media performance and execute on it according to some embodiments. Such application applies equally to the inventory owners' own promotional marketing efforts where continuous schedule adjustments can improve media performance.

Reacting to last-minute live television advertising opportunities is a problem for sellers. The variable length of live events such as sports, entertainment events and news can introduce last minute opportunities to place impression-based advertisements. The methods and system described according to some embodiments may solve this problem by continually making adjustments to the schedule to find targeted audiences even if the placement opportunities are being created in a live event. This process is according to some embodiments. Such application applies equally to the inventory owners own promotional marketing efforts where continuous schedule adjustments can accommodate new inventory created in live events.

Managing infrastructure bandwidth constraints is a problem for Household Addressable sellers. The concurrent play-out of many addressable advertisements may overload video bandwidth and cause video quality issues. The methods and system described according to some embodiments may solve this problem by continually making adjustments to schedule the addressable advertising at times where there is manageable concurrency and execute on it according to some embodiments without video performance issues. Such application applies equally to the inventory owners own promotional marketing efforts where continuous schedule adjustments can manage addressable concurrency.

Reacting to social trends in TV campaigns is an issue for some sellers. The advertiser may want to adjust a campaign based on social media trends including adjusting the placement of media where it has historically generated desirable social activity, adjusting the creative based on social commentary and adjusting the campaign plan based on social signals. The seller cannot easily react to this because of the fixed schedule that has been created. The methods and system described according to some embodiments may solve this problem by continually making adjustments to the schedule based in micro trend inputs such as social according to some embodiments. Such application applies equally to the inventory owners' own promotional marketing efforts where continuous schedule adjustments can react to marketing micro trends.

Reacting to geographical micro-trends in TV campaigns is an issue for sellers. The advertiser may want to adjust a campaign creative, plan and media placements based on geographical micro-events including new customer data, weather trends and the outcome of sports events. The seller cannot easily react to this because of the fixed schedule that has been created. The methods and system described according to some embodiments may solve this problem by continually making adjustments to the schedule based on intermittent or continuous micro trend inputs according to some embodiments. Such application applies equally to the inventory owners' own promotional marketing efforts where continuous schedule adjustments can react to marketing micro trends.

Creative versioning optimization is an issue for some sellers. The advertiser may want to introduce new creative, adjust rotation or audience targeting parameters mid-campaign. The seller cannot easily react to this because of the fixed schedule that has been created. The methods and system described according to some embodiments may solve this problem by continually making adjustments to the schedule based on updated creative, rotation and targeting parameters according to some embodiments. Such application applies equally to the inventory owners' own promotional marketing efforts where continuous schedule adjustments can react to updated creative versions, rotation and creative targeting parameters.

Allocating Audience Deficiency Units (ADUs) efficiently is an issue for some sellers. ADUs are typically unsold inventory set aside by a TV station or network planning group and allocated to underperforming campaigns. The allocation decision is typically made on-the-fly by staff with incomplete data and is rarely optimal. The methods and system described according to some embodiments may solve this problem by continually making decisions on how to best allocate the ADUs based on all the pacing, pricing and audience information available according to some embodiments. Such application applies equally to the inventory owners' own promotional marketing efforts where ADUs can be allocated to meet marketing campaign delivery goals.

Allocating marketing impressions to advertising campaigns is an issue for sellers. The allocation of units and impressions to marketing or advertising campaigns is somewhat arbitrary and not based on the potential impression-based demand and revenue that can be achieved by sellers in defined time windows. The methods and system described according to some embodiments may solve this problem by continually making decisions on how to best reallocate impressions and units between all campaigns to meet each campaigns needs and goals according to some embodiments. Such application applies equally to promotional marketing efforts where there may be an optimal marketing unit but it has been arbitrarily allocated to media sales.

Micro-campaign execution is an issue for some sellers. The buyer may want to break up their budget and spend it on many micro-campaigns that last only a few days but the sellers systems and staff have difficulty processing the operational burden created. The methods and system described according to some embodiments may solve this problem by automating the allocation of impressions and units based on each campaigns needs and goals and largely eliminating the planning and campaign monitoring activities according to some embodiments. Such application applies equally to the inventory owners' own promotional marketing efforts where automated schedule adjustments can support micro campaigns.

National-to-community or national-to-household execution is a problem for sellers who enable this service. In this scenario a national advertising unit may be localized by the local operator and a different local advertisement substituted at the community (Cable Zone) or Household level. Ensuring the campaign impression pacing is on-track both for the localized campaign and the local sellers other campaigns is challenging. The methods and system described according to some embodiments may solve this problem by automating the impression pacing and allocation of impressions and units based on each campaigns needs and goals according to some embodiments. Such application applies equally to the inventory owners' own promotional marketing efforts where automated scheduling can manage localized national units for marketing campaigns.

Optimizing the delivery of upfront and scatter campaigns is a problem for sellers compounded by a combination of units and impression-based campaigns. Ensuring the guaranteed audience sold in an upfront is not jeopardized by short-term scatter campaigns is critical, but the seller also wants to maximize revenue at any moment by optimizing allocation between the upfront commitments and scatter opportunities. The methods and system described according to some embodiments may solve this problem by optimizing the allocation of impressions and units across all campaign commitments based on impression pacing, forecasted audience and campaign needs and goals according to some embodiments.

Optimizing a blended unit and impression campaign is a problem for sellers that do not have the ability to blend units and impressions into the same campaign. The units may be required in specific program titles or as units on an unrated network where there is no audience estimate. The methods and system described according to some embodiments may solve this problem by treating the specific units as a constraint that must be met as it optimizes the allocation of all impressions across the campaign according to some embodiments. Such application applies equally to the inventory owners' own promotional marketing efforts where automated scheduling can manage localized national units for marketing campaigns.

Forecasting capacity against audiences in support of upfront deals is a problem for sellers. Typically they do not have the ability to analyze audience impressions across multiple deals to view the capacity. This capacity visibility is needed to set prices based on demand and confirm that the deals are likely to be fulfilled if sold. Optimizing prospective deals based on the capacity visibility can also allow sellers to prioritize deals based on the most revenue per audience. The methods and system described according to some embodiments may solve this problem forecasting long-term audiences, available inventory and optimizing the allocation of impressions to competing deals. Contracted deals may then be executed according to some embodiments.

In addition, as depicted in FIG. 5, methods and systems configured according to some embodiments may solve various problems 505 for inventory owners or sellers to achieve a desired outcome 510 using certain optimization data 515 to generate output 520 that may solve a seller problem. Non-limiting examples of seller problems 505 include under/over delivery 525*a*, scheduling opportunity cost 525*b*, changing viewing 525*c*, increasing reach or frequency 525*d*, optimizing inventory yield 525*e*, cross-platform optimization 525*f*, and performance feedback 525*g*.

Figure 6:
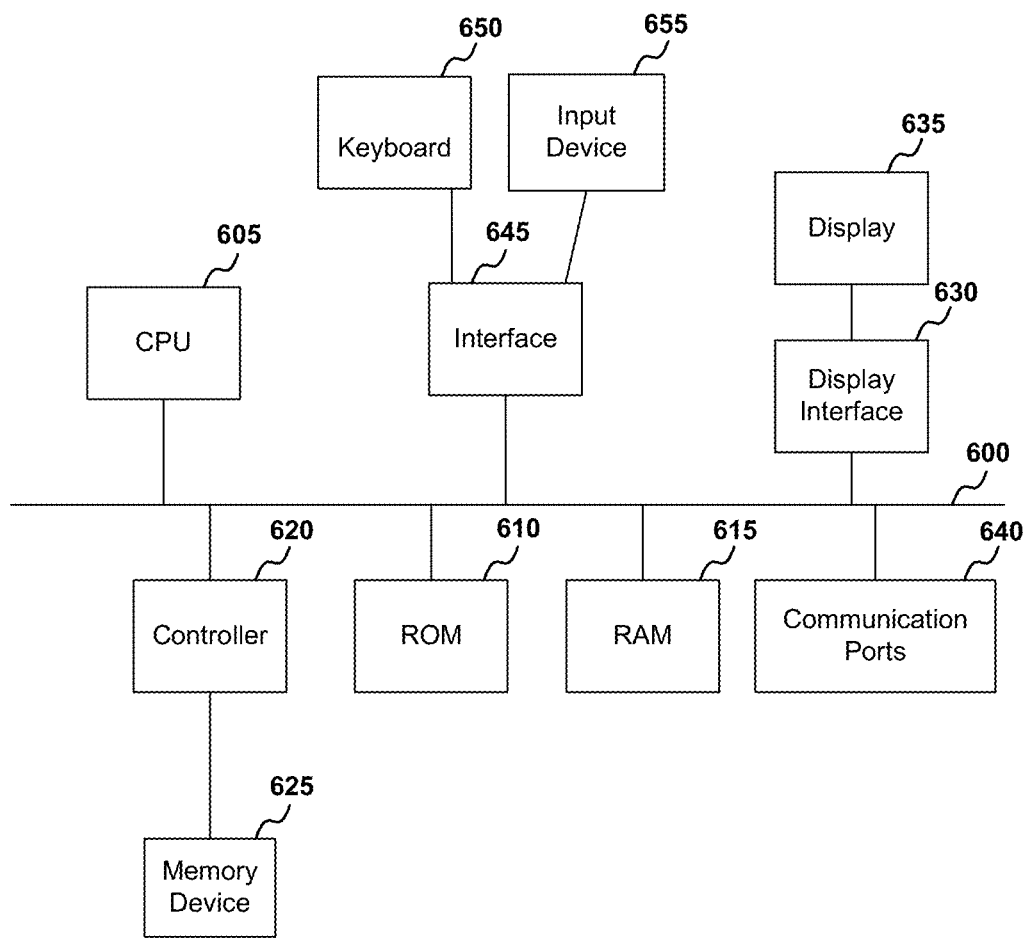
FIG. 6 depicts a block diagram of illustrative internal hardware that may be used to contain or implement program instructions according to an embodiment.

FIG. 6 depicts a block diagram of exemplary internal hardware that may be used to contain or implement program instructions, such as the modules and/or process steps discussed above in reference to FIGS. 1-4. A bus 600 serves as the main information highway interconnecting the other illustrated components of the hardware. CPU 605 is the central processing unit of the system, performing calculations and logic operations required to execute a program. CPU 605 is an exemplary processing device, computing device or processor as such terms are using in this disclosure. Read only memory (ROM) 610 and random access memory (RAM) 615 constitute exemplary memory devices.

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions, software or interactive modules may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-Ray™ disc, and/or other recording medium.

An optional display interface 630 may permit information from the bus 600 to be displayed on the display 635 in audio, visual, graphic or alphanumeric format. Communication with external devices may occur using various communication ports 640. An exemplary communication port 640 may be attached to a communications network, such as the Internet or an intranet. Other exemplary communication ports 640 may comprise a serial port, a RS-232 port, and a RS-485 port.

The hardware may also include an interface 645 which allows for receipt of data from input devices such as a keyboard 650 or other input device 655 such as a mouse, a joystick, a touch screen, a remote control, a pointing device, a video input device, and/or an audio input device.

Computer program logic implementing all or part of the functionality previously described herein may be embodied in various forms, including, but in no way limited to, a source code form, a computer executable form, and various intermediate forms (for example, forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in a non-transitory form (for example, a source code form, a computer executable form, an intermediate form, or combinations thereof) in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink-wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

It will further be appreciated that the above-described methods and procedures may be provided using the systems disclosed herein, or on other types of systems. The methods and procedures, unless expressly limited, are not intended to be read to require particular actors or systems performing particular elements of the methods.

In the preceding specification, the present invention has been described with reference to specific example embodiments thereof. It will, however, be evident that various modifications and changes may be made thereunto without departing from the broader spirit and scope of the present invention. The description and drawings are accordingly to be regarded in an illustrative rather than restrictive sense.

What is claimed is:

1. A device comprising:
   one or more processors; and
   memory storing instructions that, when executed by the one or more processors, cause the device to:
   receive, from one or more computing devices, first information indicating:
      inventory available at a first time interval,
      historical target data and advertising campaign goal data associated with the inventory, and
      bandwidth constraints at the first time interval;
   generate, based on the first information, at least one schedule comprising an allocation of inventory during the first time interval for one or more content assets;
   insert, based on the at least one schedule, the one or more content assets into one or more streams of content, wherein each content asset of the one or more content assets is associated with an inventory identifier;
   send, to one or more content presentation devices, the one or more streams of content to cause presentation of the one or more content assets;
   receive, from the one or more computing devices, second information indicating at least one inventory identifier associated with at least one content asset of the one or more content assets that was interacted with by the one or more content presentation devices; and
   generate, based on the second information, an updated at least one schedule comprising an updated allocation of inventory during a second time interval for the at least one content asset.

2. The device of claim 1, wherein the historical target data comprises at least one of historical television ratings information, forecasted ratings, or impressions.

3. The device of claim 1, wherein the instructions, when executed by the one or more processors, further cause the device to:
   verify the second information, based at least in part on a match of the at least one inventory identifier associated with the at least one content asset, with a second inventory identifier associated with the indicated interaction with the at least one content asset.

4. The device of claim 1, wherein the advertising campaign goal data indicates at least one of the one or more campaign goals, campaign budget, or campaign constraints.

5. A method comprising:
   receiving, from one or more computing devices, first information indicating:
      inventory available at a first time interval,
      historical target data and advertising campaign goal data associated with the inventory, and
      bandwidth constraints at the first time interval;
   generating, based on the first information, at least one schedule comprising an allocation of inventory during the first time interval for one or more content assets;
   inserting, based on the at least one schedule, the one or more content assets into one or more streams of content, wherein each content asset of the one or more content assets is associated with an inventory identifier;
   sending, to one or more content presentation devices, the one or more streams of content to cause presentation of the one or more content assets;
   receiving, from the one or more computing devices, second information indicating at least one inventory identifier associated with at least one content asset of the one or more content assets that was interacted with by the one or more content presentation devices; and
   generating, based on the second information, an updated at least one schedule comprising an updated allocation of inventory during a second time interval for the at least one content asset.

6. The method of claim 5, wherein the historical target data comprises at least one of historical television ratings information, forecasted ratings, or impressions.

7. The method of claim 5, further comprising:
verifying the second information, based at least in part on a match of the at least one inventory identifier associated with the at least one content asset, with a second inventory identifier associated with the indicated interaction with the at least one content asset.

8. The method of claim 5, wherein the advertising campaign goal data indicates at least one of the one or more campaign goals, campaign budget, or campaign constraints.

9. A non-transitory computer-readable storage medium storing computer-readable instructions that, when executed by a processor, cause:
receiving, from one or more computing devices, first information indicating:
inventory available at a first time interval,
historical target data and advertising campaign goal data associated with the inventory, and
bandwidth constraints at the first time interval;
generating, based on the first information, at least one schedule comprising an allocation of inventory during the first time interval one or more content assets;
inserting, based on the at least one schedule, the one or more content assets into one or more streams of content, wherein each content asset of the one or more content assets is associated with an inventory identifier;
sending, to one or more content presentation devices, the one or more streams of content to cause presentation of the one or more content assets;
receiving, from the one or more computing devices, second information indicating at least one inventory identifier associated with at least one content asset of the one or more content assets that was interacted with by the one or more content presentation devices; and
generating, based on the second information, an updated at least one schedule comprising an updated allocation of inventory during a second time interval for the at least one content asset.

10. The non-transitory computer-readable storage medium of claim 9, wherein the historical target data comprises at least one of historical television ratings information, forecasted ratings, or impressions.

11. The non-transitory computer-readable storage medium of claim 9, further storing computer-readable instructions that, when executed by the processor cause:
verifying the second information, based at least in part on a match of the at least one inventory identifier associated with the at least one content asset, with a second inventory identifier associated with the indicated interaction with the at least one content asset.

12. The non-transitory computer-readable storage medium of claim 9, wherein the advertising campaign goal data indicates at least one of the one or more campaign goals, campaign budget, or campaign constraints.

13. The device of claim 1, wherein the allocation is based at least in part on execution of an analytic heuristic process and one or more conditions.

14. The method of claim 5, wherein the allocation is based at least in part on execution of an analytic heuristic process and one or more conditions.

15. The non-transitory computer-readable storage medium of claim 9, wherein the allocation is based at least in part on execution of an analytic heuristic process and one or more conditions.

16. The non-transitory computer-readable storage medium of claim 9, wherein the allocation of inventory prioritizes the one or more content assets based on the advertising campaign goal data.

17. The device of claim 1, wherein the allocation of inventory prioritizes the one or more content assets based on the advertising campaign goal data.

18. The method of claim 5, wherein the allocation of inventory prioritizes the one or more content assets based on the advertising campaign goal data.

* * * * *